A. W. LOCKHART.
Device for Conducting Grain to Thrashing Machines.
No. 82,135. Patented Sept. 15, 1868.
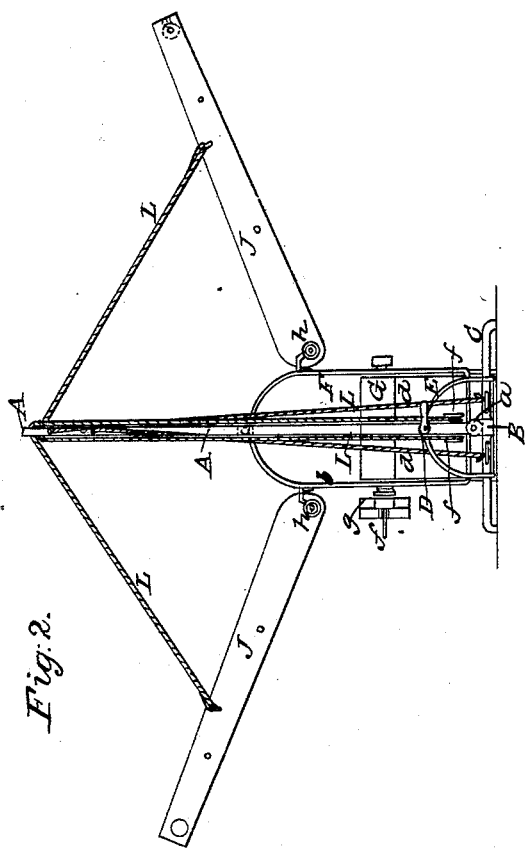
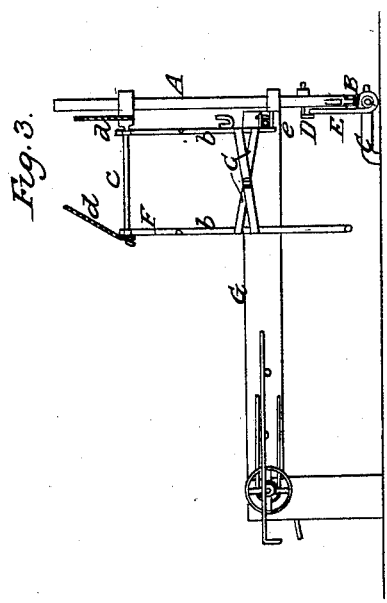
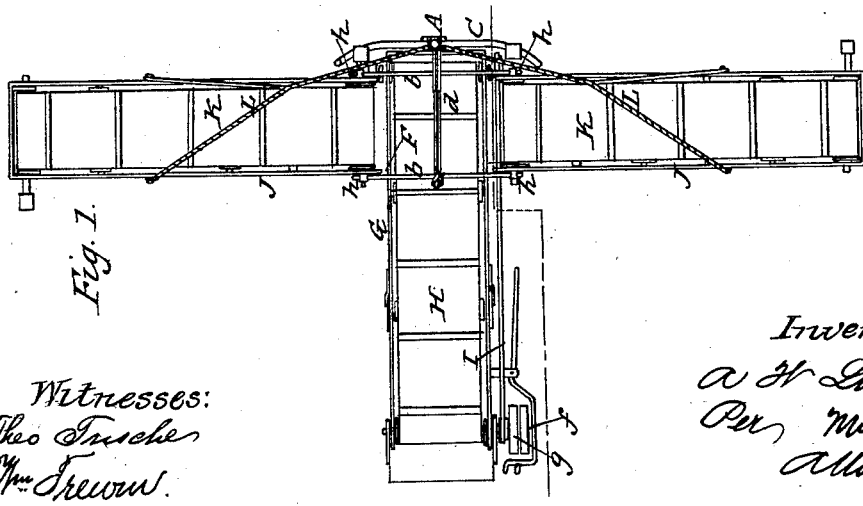

UNITED STATES PATENT OFFICE.

A. W. LOCKHART, OF SACRAMENTO, CALIFORNIA.

IMPROVEMENT IN DEVICE FOR CONDUCTING GRAIN TO THRASHING-MACHINES.

Specification forming part of Letters Patent No. 82,135, dated September 15, 1868.

*To all whom it may concern:*

Be it known that I, A. W. LOCKHART, of Sacramento, in the county of Sacramento and State of California, have invented a new and Improved Device for Conducting Grain to Thrashing-Machines; and I do hereby declare that the following is a full, clear, and exact description thereof, which will enable those skilled in the art to make and use the same, reference being had to the accompanying drawings, forming part of this specification.

This invention relates to a new and improved device for conducting grain from the stack or from wagons to thrashing-machines, thereby effecting a great saving in labor in thrashing grain.

In the accompanying sheet of drawings, Figure 1 is a plan or top view of my invention; Fig. 2, an end view of the same; Fig. 3, a side view of a portion of the same.

Similar letters of reference indicate corresponding parts.

A represents an upright pole, of any suitable or required height, and having its lower end secured by a joint or pivot, $a$, in a socket, B, placed on a rod, C, secured horizontally to the ground or flooring in any proper manner. This pole is retained in position by a clamp, D, connected with a semicircular rod, E, attached to the base-rod C. By means of this clamp-connection the pole A may always be adjusted in a vertical position, even if the base-rod C be attached to an uneven surface, and therefore out of a horizontal plane.

F is a frame, constructed of two bow-shaped rods, $b\ b$, connected by rods $c\ c$. This frame F is suspended to the pole A by ropes $d$, and may be adjusted higher or lower, as desired.

G is an oblong rectangular frame or box, having an open top and bottom, and in which an endless apron, H, is placed. The inner end of this frame or box is suspended in hooks $e\ e$, at the lower ends of the rear bow-shaped rod $b$, and the outer end is fitted to the thrashing-machine at such a point that the apron H will conduct the grain to the thrashing-cylinder thereof. This apron is driven by a belt, which extends around a pulley, $f$, on the front or outer roller of the apron, an idle-pulley, $g$, being on said roller, the driving-belt being shifted on said pulley when it is desired to stop the motion of the apron H. The front and rear rollers of the apron H have a belt, I, passing around them.

J J are two frames or boxes, constructed precisely similar to G, and have their inner ends fitted in hooks $h\ h$, attached to the frame F. These frames or boxes are each provided with an endless apron, K, and the journals of the inner rollers of these aprons extend sufficiently far through the sides of the frames or boxes J J to rest in the hooks $h\ h$ on the frame F. The journals of the inner roller of the apron H also rest on the hooks $e\ e$ of the frame F.

The frames or boxes J J may be adjusted in a horizontal position, or in a more or less inclined position, by means of ropes L L, which pass through sheaves in the pole A, and, extending down, are wound around cleats $f$, attached to the lower part of the pole. (See Fig. 2.)

The aprons K K are operated from the thrashing-machine by any suitable arrangement of belts, and by the use of said aprons grain may be fed to a thrashing-machine simultaneously from two stacks, or from two wagons or carts.

By this simple device very little handling of the grain is required, whereas usually it is handled or forked four or five times in getting it from the stacks or wagons to the thrashing-machine.

I claim as new and desire to secure by Letters Patent—

The employment or use of a plurality of endless aprons, H K K, connected with a frame, F, and an adjustable upright pole, A, and all arranged in such a manner that the aprons may be adjusted at different degrees of inclination, in order to feed grain from stacks or wagons to thrashing-machines, and the pole rendered capable of always being adjusted in a vertical position, even when placed on uneven or inclined ground, substantially as and for the purpose herein set forth.

A. W. LOCKHART.

Witnesses:
WM. McPHERSON,
J. P. CHENEY.